July 31, 1956 — H. W. FAEBER — 2,756,803
PLATE CURVING MACHINE
Filed Nov. 12, 1952 — 5 Sheets-Sheet 1

FIG. I.

INVENTOR.
HARRY W. FAEBER
BY Campbell, Brumbaugh, Free & Graves
his ATTORNEYS

July 31, 1956 — H. W. FAEBER — 2,756,803
PLATE CURVING MACHINE
Filed Nov. 12, 1952 — 5 Sheets-Sheet 2

INVENTOR.
HARRY W. FAEBER

INVENTOR.
HARRY W. FAEBER
BY
Campbell, Brumbaugh, Free & Graves
his ATTORNEYS.

July 31, 1956 H. W. FAEBER 2,756,803
PLATE CURVING MACHINE
Filed Nov. 12, 1952 5 Sheets-Sheet 4

INVENTOR.
HARRY W. FAEBER
BY
Campbell, Brumbaugh, Free & Graves
his ATTORNEYS.

July 31, 1956 H. W. FAEBER 2,756,803
PLATE CURVING MACHINE
Filed Nov. 12, 1952 5 Sheets-Sheet 5

INVENTOR.
HARRY W. FAEBER
BY
Campbell, Brumbaugh, Free & Graves
his ATTORNEYS.

United States Patent Office 2,756,803
Patented July 31, 1956

2,756,803
PLATE CURVING MACHINE

Harry W. Faeber, Larchmont, N. Y., assignor to Time, Incorporated, New York, N. Y., a corporation of New York Application November 12, 1952, Serial No. 320,097

10 Claims. (Cl. 153—40)

The present invention relates to apparatus for curving plates, such as printing plates, and, more particularly, to apparatus for so controlling the bending of plates having non-uniform cross section that sharp bends on thin cross sections are avoided, and a tangential relationship between the plate and the form over which it is bent is at all times maintained.

The present applicant and George N. Sandor, have previously disclosed in patent application No. 162,526, entitled "Apparatus for Curving Printing Elements" and filed May 17, 1950, and issued Aug. 31, 1954 as Patent No. 2,687,762, a machine for curving flat printing plates to conform to the curvature of the printing cylinder of a rotary printing press. The prior apparatus provided controlled bending which progressed evenly outwards from a single line of contact with a forming saddle. This contrasts with free curving and ensures that the plate when curved will register precisely throughout the entire printing area. Registration, of course, is particularly exacting where the plates are employed in color reproduction.

It is an object of the present invention to provide simple and effective apparatus for the controlled bending of plates.

According to one aspect of the invention, apparatus for curving plates is provided comprising a plate-forming roller, an unwinding roller and a flexible bending sheet or web stretched between the rollers and at least partially wrapped about one of the same. The rollers are rotatably coupled together for simultaneously rotation and a plate that is to be curved is rolled between the plate-forming roller and the bending web as the bending web unrolls from the unwinding roller.

In order that the invention may be more clearly understood, it will now be described in detail with reference to the accompanying drawings wherein:

Fig. 1 is a plan view of the tangential curving machine;

Figure 12:
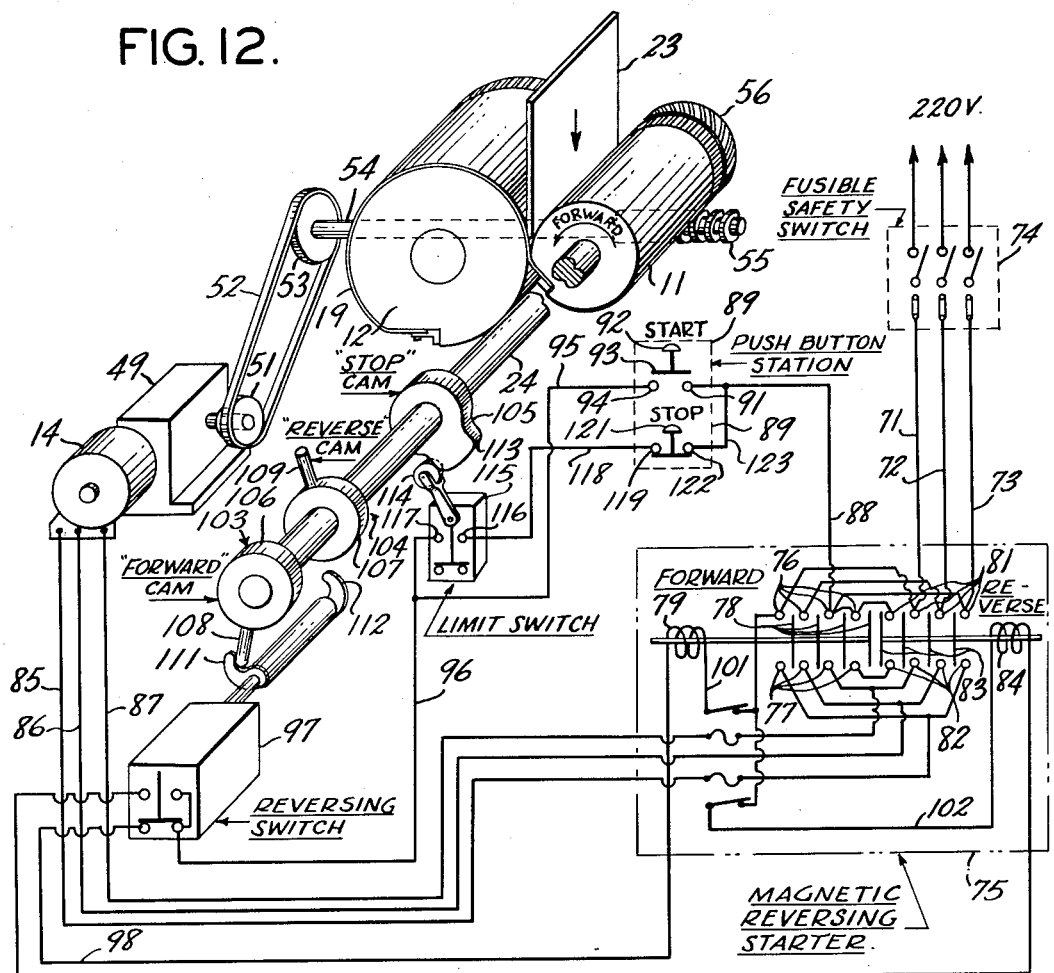
Figure 10:
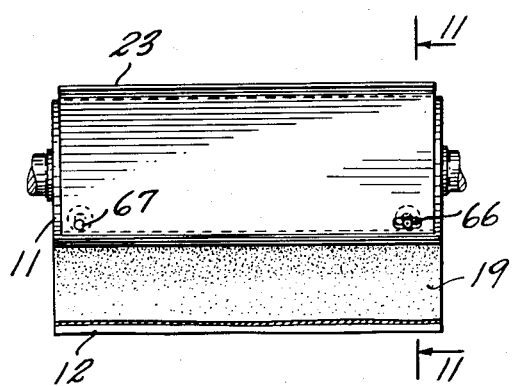
Figure 11:
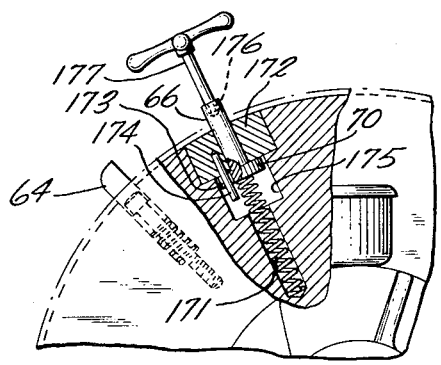
Figure 13:
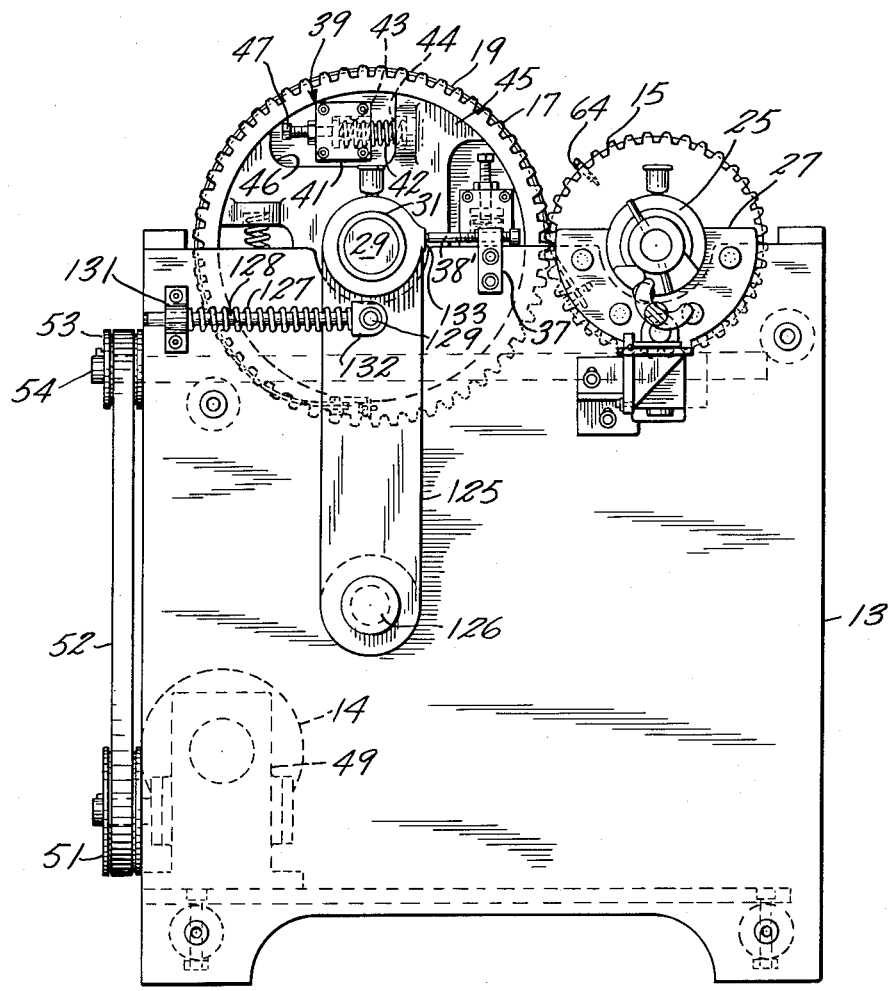

Figs. 6—9 are schematic views of the rollers and the bending web seen in end elevation, illustrating the tangential curving action of the machine;

Fig. 10 is a plan view of a detail of the machine, illustrating the registration of a plate on the plate-forming roller at the commencement of the curving operation;

Fig. 11 is a cross section view of an enlarged portion of the plate-forming roller taken along the line 11—11 in Fig. 10 in the direction indicated by arrows, showing the construction of a plate-registering pin;

Fig. 12 is a schematic diagram of electrical controls for operating the machine; and Fig. 13 is an end elevation view of the machine showing an alternative arrangement for mounting the unwinding roller for adjustment relative to the plate-forming roller.

Referring now to the drawings, a plate-forming roller 11 and an unwinding roller 12 are located side by side in a horizontal position on a supporting frame 13. The plate-forming roller 11 is adapted to be driven by a motor 14 and is rotatably coupled to the unwinding roller 12 by means of gears 15 and 16 which are mounted at opposite ends of the plate-forming roller 11 in fixed relation thereto and engage gears 17 and 18, respectively, which are connected, preferably resiliently, to the ends of unwinding roller 12. A flexible bending sheet or web 19, having substantial tensional strength, at least partially wraps about at least one of the rollers and is attached along the length of the rollers 11 and 12 in longitudinal recesses 21 and 22, respectively, therein. The bending web 19 is held in tension and at all times remains tangent to those surfaces of the rollers with which it is in contact. The relationship between the peripheral dimensions of the rollers 11 and 12 and the pitch diameters of the gears 15, 16, 17 and 18 are so chosen that the plate-forming roller 11 has the same peripheral velocity as the unwinding roller 12. Thus, the bending web 19 will wrap around the plate-forming roller 11, while the tension in the web remains constant. If a printing plate 23 is fed between the plate-forming roller 11 and the bending web 19, the effective radius of the roller 11 is increased by the thickness of the plate 23 so that the peripheral velocity of the outer surface of the plate 23 becomes greater than the peripheral velocity of the pitch lines of the gears 17 and 18. As a result, the web 19 tends to move faster than the roller 12 and the plate 23 will be constrained by the web 19 to conform to the shape of the roller 11 as the plate is progressively squeezed by the web 19. This action is clearly shown in Figures 6 to 9.

The roller 11 is mounted on stub shafts 24 which rotate in bearings 25 and 26. The bearings 25 and 26 are secured by hangers 27 and 28, respectively, which are bolted to the ends of the frame 13. The roller 12 is similarly mounted on stub shafts 29 rotating in bearings 31 and 32 fixed to the hangers 33 and 34, respectively. The hangers 33 and 34 are adjustably secured to the ends of the frame 13 by means of bolts 35 which project through horizontal slots 36 in the hangers. The slots 36 permit the axial separation between the rollers 11 and 12 to be slightly altered to allow for different plate thicknesses. In order to set accurately and to retain the desired spacing between the rollers, pairs of lugs 37 are provided extending from the ends of the frame 13 on either side of the hangers 33 and 34. The lugs 37 are horizontally threaded to receive adjustment screws 38 which bear against the lateral edges of the hangers and may be tightened to hold the roller 12 at the desired horizontal distance from the roller 11.

Fig. 13 discloses an alternative arrangement for adjusting the unwinding roller 12 with respect to the plate-forming roller 11. The bearing 31 for the shaft 29 of the roller 12 is mounted at the upper end of a substantially vertical arm 125 which is pivotally supported at its lower end on a stud 126 which projects from the end of the supporting frame 13. The upper end of the arm 125 is resiliently urged toward the roller 11 by means of a helical compression spring 127 which surrounds a generally horizontal rod 128. The rod 128 is pivotally connected to the arm 125 by a stud 129 and is guided at its other end by a bracket 131 which is fastened to the end of the frame 13. The spring 127 acts between a shoulder 132 on the rod 128 adjacent the stud 129 and the opposing face of the bracket 131. An adjustment screw 38' carried by the lug 37 between the roller 12 and the roller 11 is extended to make contact with a face 133 on the arm 125 opposite the bearing 31. The bearing 32 supporting the other end of the shaft 29 is mounted to the frame 13 in a manner identical to that of the bearing 31.

Figure 4:
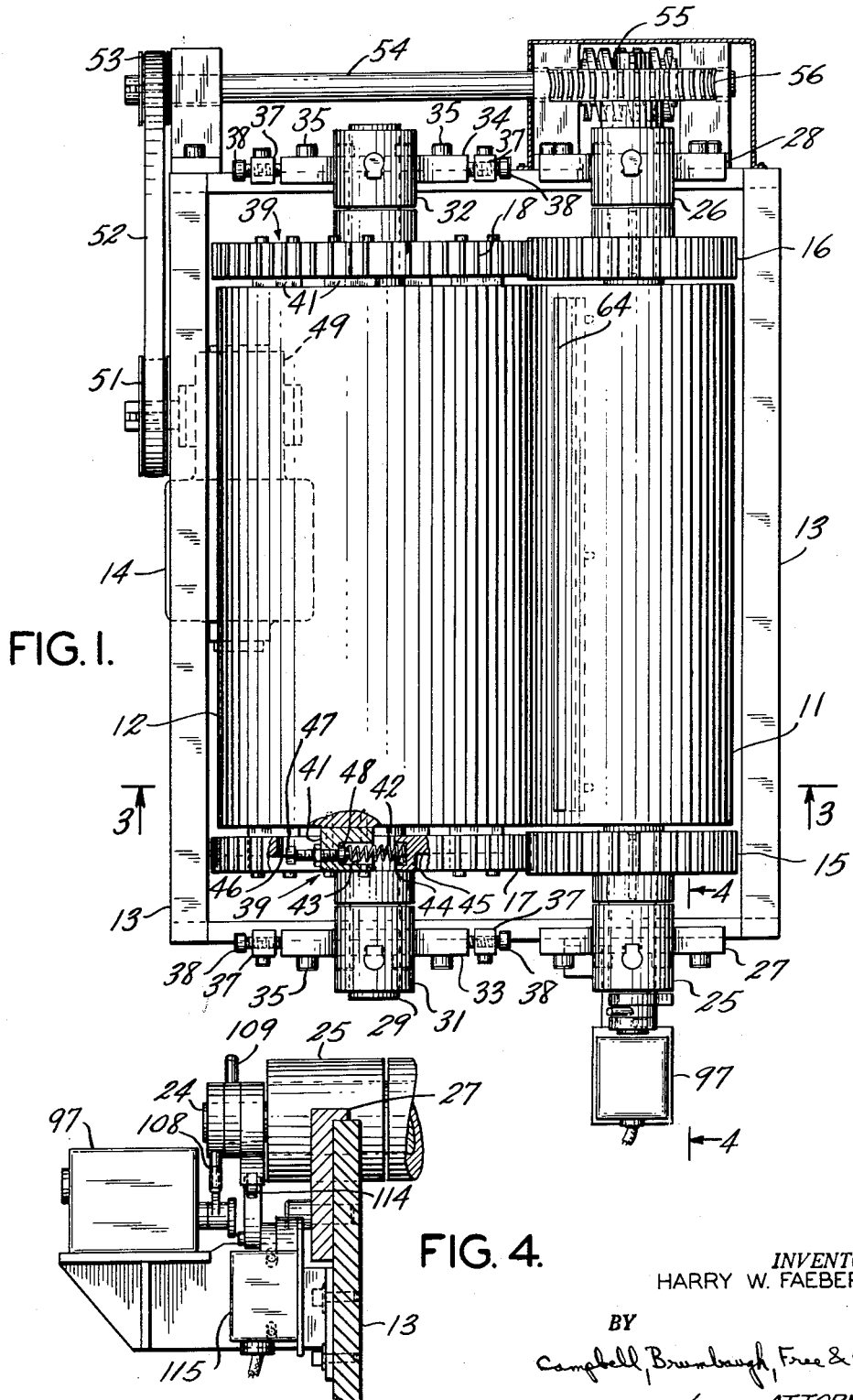
Fig. 4 is a side elevation view, partly in section, of a detail of the machine taken along the line 4—4 in the direction indicated by arrows.
Figure 2:
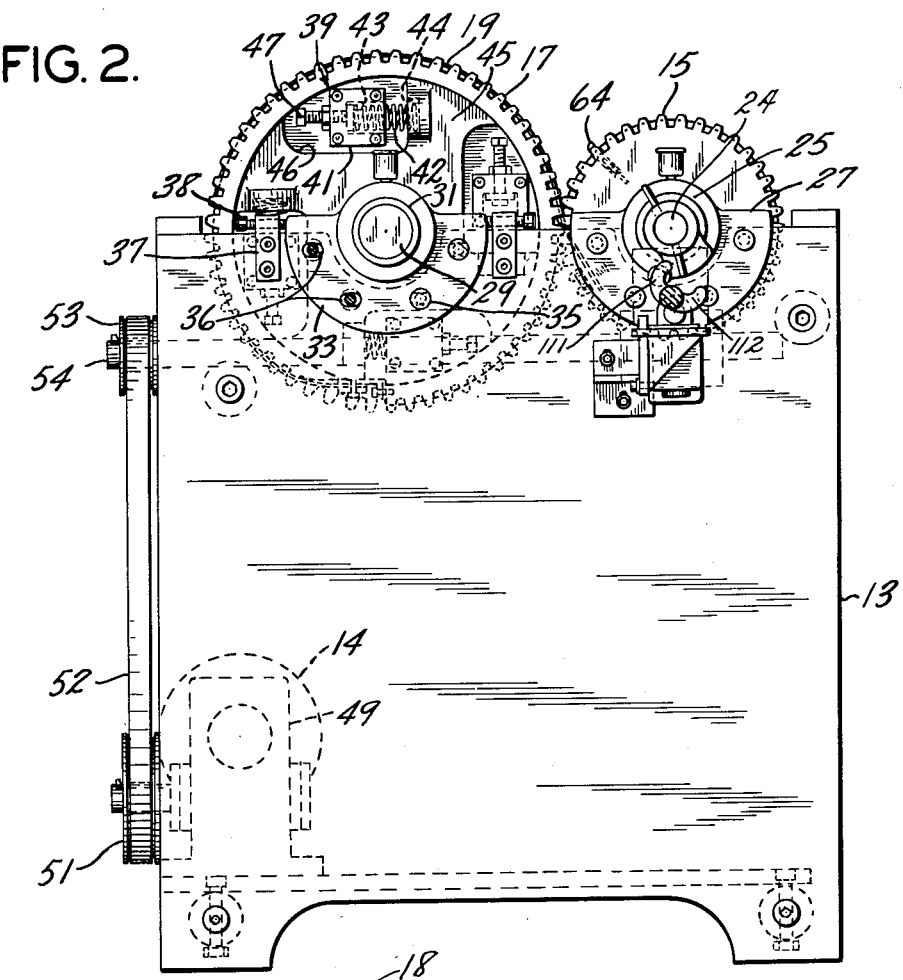
Fig. 2 is an end elevation view of the machine, with certain controls omitted.

The arrangement illustrated in Fig. 13 has certain advantages over that shown in Fig. 2. The adjustment screw 38' is used to adjust the minimum gap between the rollers 11 and 12, but the spring 127 permits the two rollers to be pushed apart in the event that an oversized plate is inserted into the machine or when an extra companion plate is accidentally placed in the machine together with the plate to be curved. The maximum pressure exerted by the rollers on a plate is likewise predetermined.

Returning now to the consideration of Figs. 1 and 2, the gears 15 and 16 are keyed to the shaft 24 while the gears 17 and 18 are permitted slight angular movement on the shaft 29 and are connected to the roller 12 by means of resilient couplings 39. The resilient couplings 39 comprise ears 41 bolted to the ends of the unwinding roller 12, each ear being adapted to receive a helical spring 42 in a bore 43 in the side thereof. The springs 42 press against cavities 44 in the edges of the webs 45 of the gears 17 and 18. The webs 45 have symmetrically spaced apertures 46 therein of a size sufficient to permit the ears 41 to extend freely therethrough. Adjustment of the tension of each spring 42 is provided by means of a tensioning bolt 47 which is threaded through the side of the ear 41 opposite the spring 42 and is adapted to press against a washer 48 at the bottom of the bore 43 in contact with the spring 42. The springs 42 allow the roller 12 to overrun the gears 17 and 18 and thus maintain a peripheral velocity equal to the peripheral velocity of the outer surface of the plate, a condition which is maintained by the non-yielding pull of the web 19. As a result, the springs 42 are compressed and thus the tension on the web is gradually increased as the plate 23 is passed between the web and the roller 11.

The motor 14 which drives the plate-forming roller 11 is connected through reduction gearing 49 to a pulley 51 which is connected by a belt 52 to a further pulley 53 keyed to a horizontal shaft 54 that is mounted to the end of the frame 13. A worm 55 on the opposite end of the shaft 54 meshes with a worm wheel 56 which is fixed to the shaft 24 of the roller 11.

Figure 3:
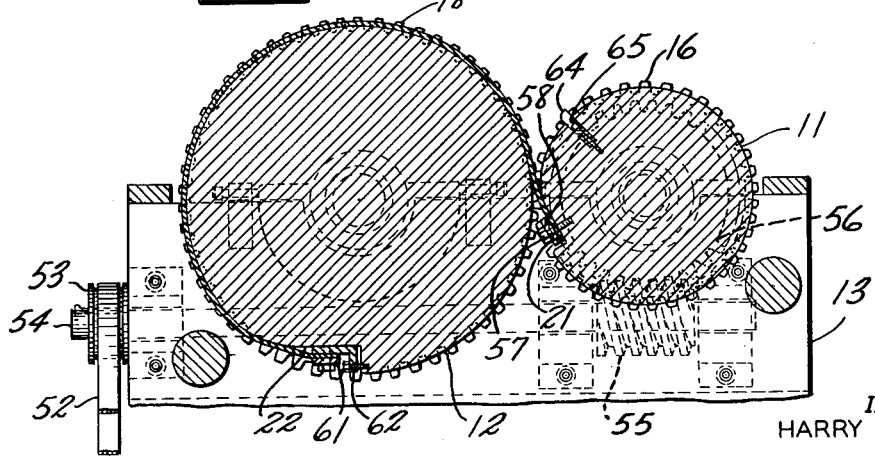
Fig. 3 is a cross section view of the machine taken along the line 3—3 of Fig. 1 in the direction indicated by arrows.
Figure 5:
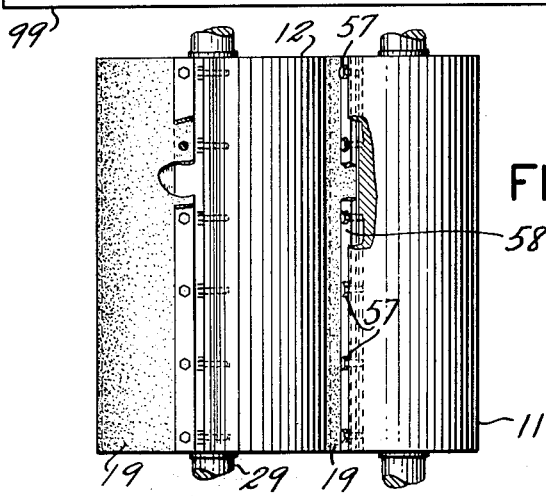
Fig. 5 is a plan view of a detail of the underside of the machine, showing the arrangement for fastening the bending web to the plate-forming roller and the unwinding roller.
Figure 6:
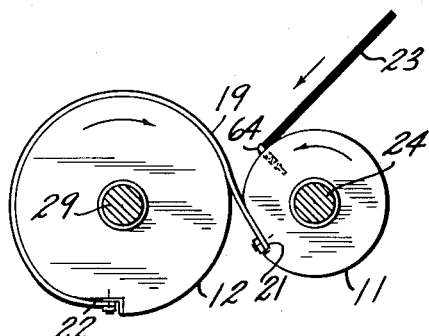
Figure 7:
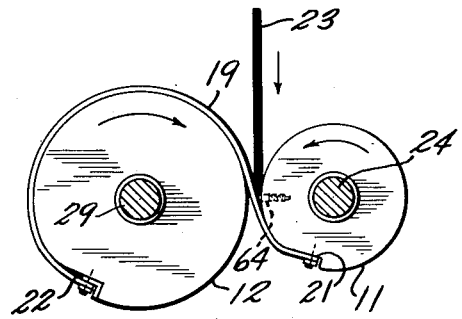
Figure 8:
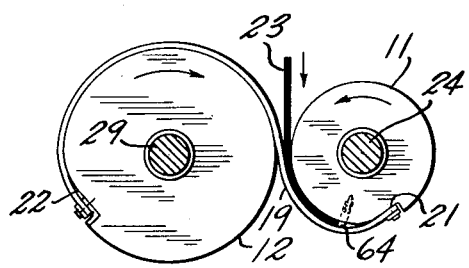
Figure 9:
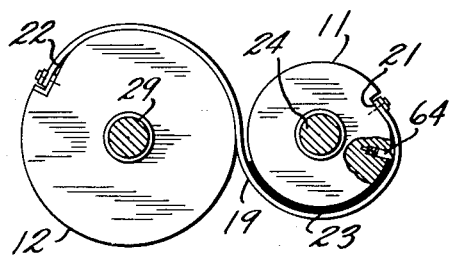

The bending web 19, as clearly shown in Figs. 3 and 5, is attached to the plate-forming roller 11 by means of bolts 57 which clamp one end of the web 19 between a strap 58 and the bottom of the longitudinal recess 21 which smoothly joins the outer surface of the roller 11. The other end of the web is bolted between a strap 61 and a angle iron 62 (Fig. 3) in the longitudinal recess 22. In order to permit non-resilient adjustment of the tension on the web 19 without altering the spacing between the rollers, the angle iron 62 which carries the end of the web 19 is bolted to the radially extending side of the longitudinal recess 22 in the roller 12.

Figure 3A:
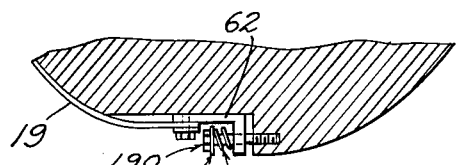
Fig. 3A is a view corresponding to a portion of the cross sectional view of Fig. 3 showing in detail an alternate arrangement for fastening the bending web to the rollers.

It is to be appreciated that the angle iron 62 may be resiliently secured, as shown in Fig. 3A, by means of a bolt 190, a spring 191, and a washer 192, to the unwinding roller 12 rather than rigidly bolted. With this modification the resilient couplings 39 may be dispensed with, if desired.

It is essential that the plate 23 to be bent must be accurately registered with the plate-forming roller 11 in order that the axis of curvature be parallel to one of the reference axes of the plate 23. The registering device may comprise a spring-pressed straight edge 64, shown in Figs. 1, 2 and 3. The straight edge 64 is adapted to be resiliently received in a radial slot 65 which extends substantially the full length of the roller 11. Alternatively, as shown in Figs. 10 and 11, spring-pressed pins 66 and 67 may be provided. These pins are adapted to engage registration holes in the printing plate 23. Either registering device is capable of not only automatically adjusting itself to the thickness of the printing plate 23 but, in the event that the curving machine is operated without a plate supplied thereto, also withdrawing flush to the surface of the plate-forming roller 11 as the bending web 19 passes over the same.

As indicated in Fig. 11, it is possible to install the straight edge 64 as well as the register pins 66 and 67 in the same plate-forming roller. However, when the straight edge 64 is used as a registering device, it is desirable to depress the pins 66 and 67 and keep them depressed in order to avoid scarring the underside of the plate that is being curved. For this purpose the register pin 66, for example, is formed with a cylindrical flange 70 at the inner end thereof. The outer end of a compression spring 171 abuts the underside of the flange 70 and normally forces the flange against the underside of a plug 172 which has a central bore through which the pin 66 slidably projects above the surface of the roller 11. The flange 70 is provided with a notch 173 which loosely accommodates a stud 174 that is secured to the plug 172 and extends into the interior of a cylindrical cavity 175. The head of the pin 66 is provided with a hexagonal socket 176.

In operation a suitable hexagonal key 177 may be inserted into the socket 176. The pin 66 may thereupon be pressed below the surface of the roller 11 until the flange 70 clears the inner end of the stud 174. The pin 66 may then be turned a partial revolution with the result that the top surface of the flange 70 will rest against the inner end of the stud 174 and thereby will keep the pin 66 in the retracted position. When it is desired to use the register pin 66 again, it is only necessary to insert the key 177 into the socket 176 and turn the pin 66 until the notch 173 is in alignment with the stud 174. Thereupon the compression spring 171 will force the pin 66 outwardly into the working position.

An electrical control system for the apparatus is shown in Fig. 12 where a three-phase alternating voltage is supplied by conductors 71, 72, and 73 through a fusible safety switch 74 to a magnetic reversing starter 75. The starter 75 comprises pairs of input contacts 76 and output contacts 77 which are adapted to be connected by shorting bars 78 when a forward solenoid 79 is energized. In a similar manner, pairs of input contacts 81 and output contacts 82 are connected by shorting bars 83 when a reverse solenoid 84 is energized. Depending upon which solenoid is activated, the conductors 71, 72, and 73 of the alternating voltage are connected for either clockwise or counter-clockwise phase rotation to conductors 85, 86 and 87, which supply electrical power to the motor 14. In the quiescent condition when neither solenoid 79 nor 84 is operated, the shorting bars 78 and 83 make no contact and no voltage is supplied to the motor 14.

A conductor 88 permanently connects one phase of the voltage source, specifically the conductor 73, to a push button station 89 where it is attached to an input contact 91 associated with a start button 92. The start button 92 carries a shorting bar 93 which, when the button is pressed against the force of a spring (not shown), bridges the input contact 91 and an output contact 94. The output contact 94 is connected by conductors 95 and 96 to a two-position reversing switch 97. The reversing switch 97 supplies any voltage present on the conductor 96 to either a conductor 98 or a conductor 99 connected to the forward and reverse solenoids 79 and 84, respectively. The solenoid circuits 79 and 84 are completed through conductors 101 and 102, respectively, to a different phase of the voltage source, specifically the conductor 71.

The angular position of the plate-forming roller 11 is correlated with the electrical control system by means of a forward cam 103, a reverse cam 104 and a stop cam 105 mounted on the shaft 24 of the roller. The forward cam 103 and the reverse cam 104 comprise collars 106 and 107, respectively, adjustably positioned on the shaft 24 and secured by set screws and having studs 108 and 109, respectively, projecting therefrom which contact ears 111 and 112, respectively, associated with the reversing switch 97.

The studs 108 and 109 on the cams 103 and 104, respectively, are angularly displaced with reference to each other according to the amount of rotation desired for the plate-forming roller 11. At the end of a forward rotation, the stud 109 on the reverse cam 104 engages the ear 112 on the reversing switch 97 and trips the same to the reverse position, connecting the conductor 96 to the conductor 99. When the roller 11 returns to the initial position, as shown in Fig. 12, the stud 108 on the forward cam 103 strikes the ear 111 and throws the reversing switch 97 to the forward position.

The stop cam 105 is arranged to discontinue the operation of the motor 14 whenever the roller 11 returns to the initial or plate-receiving position after a forward and reverse cycle. The stop cam 105 is provided with a shoulder 113 which engages a cam follower 114 that is connected to a limit switch 115. In the start position the cam follower 114 is engaged by the cam shoulder 113 and the limit switch 115 is in its open position. After operation has been initiated by pressing the start button 92 at the push button station 89, the shoulder 113 moves away from the cam follower 114 permitting input and output contacts 116 and 117, respectively, in the limit switch 115 to be shorted. The output contact 117 is connected to the conductor 96 leading to the reversing switch 97, while the input contact 116 is connected by a conductor 118 to the output contact 119 of a stop switch 121 at the push button station 89. The output contact 119 is nomally shorted to an input contact 122 which is connected by a conductor 123 through the conductor 88 to one phase of the alternating source, specifically the conductor 73.

If, at any position in the operation cycle of the plate-forming roller 11, it is desired to bring the machine to an emergency halt, the stop switch 121 may be pressed breaking the electrical connection to both the forward and reverse solenoids in the magnetic reversing starter 75 and consequently stopping the motor 14. This also results in the disconnection of the contacts through which voltage is supplied to the input contact 122 of the stop switch 121. Upon releasing the stop switch 121, the motor 14 will remain inoperative until the start button 92 is again pressed to initiate or complete the operation cycle.

A simple and effective plate-curving machine has been disclosed and illustrated in detail. It is to be understood, however, that the machine is susceptible of various modifications within the general principles of the invention. For example, different plate thicknesses may be accommodated by feeding to the plate-forming roller a compressible companion sheet or a suitable sheet from a set of non-compressible companion sheets of various thicknesses together with the plate to be bent. Accordingly, the scope of the invention is limited only by the appended claims.

I claim:

1. Apparatus for curving plates, such as printing plates, comprising a plate-forming roller, an unwinding roller substantially parallel with said plate-forming roller, a flexible bending web having opposite ends connected to said rollers, means for maintaining said bending web under tension between said rollers, and means for rotating said rollers at substantially the same peripheral speed to roll a plate between said bending web and said plate-forming roller as said bending web unrolls from said unwinding roller.

2. Apparatus for curving plates, such as printing plates, comprising a plate-forming roller, an unwinding roller substantially parallel with said plate-forming roller, a flexible bending web having opposite ends connected to said rollers, means rotatably coupling said rollers together for simultaneous rotation in opposite directions at substantially the same peripheral speed, means for resiliently maintaining said bending web under tension between said rollers, and means for rotating said rollers to roll a plate between said bending web and said plate-forming roller as said bending web unrolls from said unwinding roller.

3. Apparatus for curving plates, such as printing plates, comprising a plate-forming roller, an unwinding roller, a flexible bending web at least partially wrapped about at least one of said rollers and having opposite ends secured to said rollers along the length of said rollers, means rotatably coupling said rollers together for simultaneous rotation in opposite directions, and means for rotating said rollers to roll a plate between said bending web and said plate-forming roller as said bending web unrolls from said unwinding roller.

4. Apparatus for curving plates, such as printing plates, comprising a cylindrical plate-forming roller, a cylindrical unwinding roller substantially parallel to and side by side with said plate-forming roller, a flexible bending web having opposite ends secured to said rollers, means for gearing said rollers together for simultaneous rotation in opposite senses, and means for rotating said rollers to roll a plate between said bending web and said plate-forming roller as said bending web unrolls from said unwinding roller.

5. Apparatus for curving plates, such as printing plates, comprising a plate-forming roller, an unwinding roller, a flexible bending web at least partially wrapped about the circumference of at least one of said rollers and secured tangentially to said rollers in longitudinal grooves therein, means resiliently coupling said rollers together for simultaneous rotation in opposite senses and means for rotating said plate-forming roller to roll a plate between said bending web and said plate-forming roller as said bending web unrolls from said unwinding roller.

6. Apparatus according to claim 5 wherein the means resiliently coupling the rollers together comprises a first gear connected to the plate-forming roller, a second gear connected to the unwinding roller and meshed with said first gear, and a resilient coupling between said second gear and said unwinding roller.

7. Apparatus for curving plates, such as printing plates, comprising a plate-forming roller, an unwinding roller, a flexible bending web connected under tension between and to said rollers and adapted to wind at least partially around the circumference of at least one of said rollers, pivotable arms for supporting one of said rollers for lateral movement relative to the other of said rollers, means for resiliently urging said pivotable arms toward said other of said rollers, and means for simultaneously rotating said rollers to roll a plate between said bending web and said plate-forming roller as said bending web unrolls from said unwinding roller.

8. Apparatus for curving plates according to claim 7 comprising adjustable limit stops for predetermining the minimum spacing between said rollers.

9. Apparatus according to claim 1 comprising a spring pressed straight edge in said plate-forming roller for aligning said plate with said plate-forming roller.

10. Apparatus according to claim 1 comprising spring pressed pins in said plate-forming roller for engagement in registration holes in said plate to align said plate with said plate-forming roller.

(References on following page)

References Cited in the file of this patent

UNITED STATES PATENTS

| | | |
|---|---|---|
| Re. 11,279 | Scott | Oct. 18, 1892 |
| 225,636 | Packham | Mar. 16, 1880 |
| 401,216 | Sagendorph | Apr. 9, 1889 |
| 437,420 | Clause | Sept. 30, 1890 |
| 480,439 | Seaton | Aug. 9, 1892 |
| 708,455 | Blake | Sept. 2, 1902 |
| 787,524 | Mattison | Apr. 18, 1905 |
| 819,644 | Flatau | May 1, 1906 |
| 927,748 | Oleson | July 13, 1909 |
| 975,185 | Walsh | Nov. 8, 1910 |
| 1,173,363 | McCarroll | Feb. 29, 1916 |
| 1,370,998 | Roemer | Mar. 8, 1921 |
| 1,486,977 | Lindgren | Mar. 18, 1924 |
| 1,530,799 | Wille | Mar. 24, 1925 |
| 1,620,476 | Lee | Mar. 8, 1927 |
| 1,702,126 | Moran | Feb. 12, 1929 |
| 1,990,579 | Adams | Feb. 12, 1935 |
| 2,232,964 | Parrish | Feb. 25, 1941 |
| 2,276,012 | Blackley | Mar. 10, 1942 |
| 2,304,629 | Emmer | Dec. 8, 1942 |
| 2,579,858 | Price | Dec. 25, 1951 |
| 2,616,463 | Potchen | Nov. 4, 1952 |